United States Patent
Tsai et al.

(10) Patent No.: US 8,214,835 B2
(45) Date of Patent: Jul. 3, 2012

(54) SCHEDULER OF VIRTUAL MACHINE MODULE, SCHEDULING METHOD THEREFOR, AND DEVICE CONTAINING COMPUTER SOFTWARE

(75) Inventors: Chieh-Ping Tsai, Taichung (TW); Mong-Fong Horng, Kaohsiung (TW); Yau-Hwang Kuo, Tainan (TW); I-Hsun Chuang, Taichung (TW); Jui-Yi Kuo, Tainan (TW)

(73) Assignee: Institute for Information Industry, Taipei (TW)

( * ) Notice: Subject to any disclaimer, the term of this patent is extended or adjusted under 35 U.S.C. 154(b) by 861 days.

(21) Appl. No.: 12/342,814

(22) Filed: Dec. 23, 2008

(65) Prior Publication Data

US 2010/0146503 A1 Jun. 10, 2010

(30) Foreign Application Priority Data

Dec. 10, 2008 (TW) ................................ 97148012 A

(51) Int. Cl.
*G06F 9/46* (2006.01)
(52) U.S. Cl. .................. 718/102; 718/103; 718/1
(58) Field of Classification Search .................. None
See application file for complete search history.

(56) References Cited

U.S. PATENT DOCUMENTS

| | | | |
|---|---|---|---|
| 4,320,451 A * | 3/1982 | Bachman et al. ............. 718/106 |
| 6,269,391 B1 * | 7/2001 | Gillespie ........................ 718/100 |
| 7,783,779 B1 * | 8/2010 | Scales et al. ................... 709/240 |
| 7,853,960 B1 * | 12/2010 | Agesen et al. ................. 719/324 |
| 7,945,908 B1 * | 5/2011 | Waldspurger et al. ............ 718/1 |
| 2003/0140175 A1 * | 7/2003 | Bonar et al. ................... 709/314 |
| 2004/0221290 A1 * | 11/2004 | Casey et al. ................... 718/104 |
| 2006/0064697 A1 * | 3/2006 | Kagi et al. ..................... 718/103 |
| 2007/0217409 A1 * | 9/2007 | Mann ............................. 370/389 |
| 2008/0184227 A1 * | 7/2008 | Matsumoto et al. .............. 718/1 |
| 2009/0204959 A1 * | 8/2009 | Anand et al. ...................... 718/1 |
| 2009/0316711 A1 * | 12/2009 | Memon et al. ................. 370/412 |

* cited by examiner

*Primary Examiner* — Idriss N Alrobaye
(74) *Attorney, Agent, or Firm* — Morris Manning & Martin LLP; Tim Tingkang Xia, Esq.

(57) ABSTRACT

A scheduler of a virtual machine (VM) module, a scheduling method thereof, and a device containing computer software are provided. The scheduler has a classification module and a scheduling module. The classification module receives at least one VM module and analyzes a resource proportion parameter to generate classification result information. The scheduling module has a first schedule queue and a second schedule queue, sort an immediately resource-required VM module to the first schedule queue and a non immediately resource-required VM module to the second schedule queue, and determine whether the VM module of the first schedule queue exists or not, and if yes, it outputs the VM module of the first schedule queue to a processor; otherwise, outputs the VM module of the second schedule queue to the processor.

15 Claims, 3 Drawing Sheets

SCHEDULER OF VIRTUAL MACHINE MODULE, SCHEDULING METHOD THEREFOR, AND DEVICE CONTAINING COMPUTER SOFTWARE

CROSS-REFERENCE TO RELATED APPLICATION

This application claims the benefit of Taiwan Patent Application No. 097148012, filed on Dec. 10, 2008, which is hereby incorporated by reference for all purposes as if fully set forth herein.

BACKGROUND OF THE INVENTION

1. Field of Invention

The present invention relates to a virtual machine (VM), in particular, to a scheduler of a VM module, a scheduling method thereof, and a device containing computer software for executing the same.

2. Related Art

Virtual machine (VM) is a technique that simulates a plurality of virtual hardware devices on a single hardware platform, so as to run a plurality of operating systems on the hardware platform.

FIG. 1 is a schematic view of a conventional VM system. Referring to FIG. 1, the VM 5 is applied to a hardware platform 6. The core of the VM 5 is a software layer called virtual machine monitor (VMM). The VMM 50 simulates each guest operating system (GOS) 501 run on a virtual hardware device 502 and each application software 503 run on the GOS 501, monitors the operating status of each GOS 501, and allocates the hardware resource on the hardware platform 6 to VM 5.

The key part of the VMM 50 is a VM scheduler (not shown) mainly for determining how to allocate the processor resource of the hardware platform 6 among the VMs 5. Therefore, the design of the scheduler directly affects the execution efficiency of the applications on hardware platform 6 as well as the reaction time and input/output (I/O) performance of the VM 5.

The scheduler of the conventional VM 5 lays emphasis on how to equally allocate the processor resource of the hardware platform 6 and ensure that the processor resource is uniformly allocated to each VM 5. However, the scheduler of the conventional VM 5 fails to solve the problem that I/O devices on the hardware platform 6 are unable to support the operations of a plurality of VMs 5 in a real-time operation environment, such that the reaction time and I/O performance of the VM 5 are undesired.

The reason why the I/O device of the hardware platform 6 in the environment of the VM 5 has a low performance is that the current I/O device is mostly interrupt-driven I/O. When the I/O device sends an interrupt request (IRQ) message, in the environment of the VM 5, the IRQ message cannot be immediately processed, as the processor resource of the hardware platform 6 is shared by a plurality of VMs 5. Only when the VM 5 intending to receive the IRQ message obtains the right to use the processor resource, the IRQ message is received. Therefore, in the environment of the VM 5, all the I/O operations in the interrupt-driven I/O mode are forced to go through an additional delay time, such that the reaction time of the VM 5 is prolonged and the I/O performance of the VM 5 is lowered.

Further, the duration of the delay time is mainly determined by the scheduler mechanism of the VM 5, and the conventional design makes the delay time extended with the increase of the number of the VM 5, such that it is impossible to maintain the quality of real-time services in the environment of the VM 5.

SUMMARY OF THE INVENTION

Accordingly, a purpose of the present invention is to provide a scheduler of a virtual machine (VM) module, a scheduling method thereof, and a device containing computer software capable of effectively allocating a processor resource to the VM.

According to above mentioned purpose, a scheduling method of a scheduler for VM modules is provided for classifying a sequence of scheduling at least one or more VM modules to be operated by a processor, effectively allocating the processor resource to the VM module, and being able to support a VM with real-time request. The method includes: obtaining at least one VM module; determining a resource proportion parameter of the VM module so as to classify the VM module and generate a classification result information; sorting the VM module to a first schedule queue or a second schedule queue according to the classification result information; determining whether the VM module of the first schedule queue exists or not, and if yes, outputting the VM module of the first schedule queue to a processor; otherwise, outputting the VM module of the second schedule queue to the processor.

The resource proportion parameter implements classification according to a proportion of an operating time of an input/output (I/O) device by the VM module to a usage time of the processor resource by the VM module. According to the classification result information, when the operating time of the I/O device is longer than the usage time of the processor resource, the VM module is sorted to a first schedule queue, and when the operating time of the I/O device is equal to or shorter than the usage time of the processor resource, the VM module is sorted to a second schedule queue. The priority of the first schedule queue is higher than that of the second schedule queue. The first schedule queue arranges a sequence of executing the VM module by the processor through a first-in first-out (FIFO) mechanism, such that in the first schedule queue, the scheduler arranges the VM module being the first sorted to the first schedule queue at a preferential order to be executed by the processor. The second schedule queue arranges the sequence of executing the VM module by the processor through a credit mechanism, such that when the VM module of the first schedule queue is executed by the processor, the second schedule queue updates the credit of the VM module thereof executed by the processor according to an upper time bound of the credit mechanism. Thereby, when the VM module of the second schedule queue has waited for an upper bound of time and after the VM module of the first schedule queue is executed by the processor, the VM module of the second schedule queue is transferred to the first schedule queue to have a higher priority of processor execution.

The method of the present invention may be implemented by a recording media or a device containing computer software. Besides, the recording media or the device containing computer software may be loaded and executed by an electronic device, such as a computer, so as achieve the above mentioned functions.

A scheduler of a VM module, including a classification module and a scheduling module, is also provided. The classification module has a first service layer, a second service layer, and a third service layer. The classification module receives at least one VM module, and classifies the VM module to the first service layer, the second service layer, or the third service layer. The scheduling module has a first schedule queue and a second schedule queue. The scheduling module sorts the VM module of the first service layer, the second service layer, and the third service class to the first schedule queue or the second schedule queue.

The first schedule queue adopts an FIFO mechanism, and the second schedule queue adopts a credit mechanism. The classification module classifies the VM module to the first service layer, the second service layer, or the third service class according to a proportion of an operating time of an I/O device by the VM module to a usage time of the processor resource by the VM module. When the operating time of the I/O device is longer than the usage time of the processor resource, the VM module is classified to the first service layer; when the operating time of the I/O device is equal to the usage time of the processor resource, the VM module is classified to the second service layer; and when the operating time of the I/O device is shorter than the usage time of the processor resource, the VM module is classified to the third service layer. The scheduling module sorts the VM module of the first service class to the first schedule queue, and the VM module of the second service class and the three service class to the second schedule queue according to the VM module of the three service layers.

The present invention achieves the following efficacies.

1. The VM module having the limit of the operating time of the I/O device is sorted to the first schedule queue, for being preferentially executed by the processor, so as to solve the problem of obtaining the processor resource after rather a long delay of the operating time of the I/O device by the VM module.

2. When the VM module of the second schedule queue has waited for the upper bound of time, the VM module of the second schedule queue is transferred to the first schedule queue and is output to the processor for execution, so as to prevent the VM module of the second schedule queue from waiting too long and thus achieve a uniform allocation of the processor resource to each VM.

3. The sequence of the VM module is arranged for being executed by the processor through the FIFO mechanism and the credit mechanism of the first schedule queue and the second schedule queue, so as to realize the execution of various service types of VM modules at the same time on a single hardware platform.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the aforementioned objectives, features, and advantages of the present invention comprehensible, embodiments accompanied with figures are described in detail below.

Figure 1:
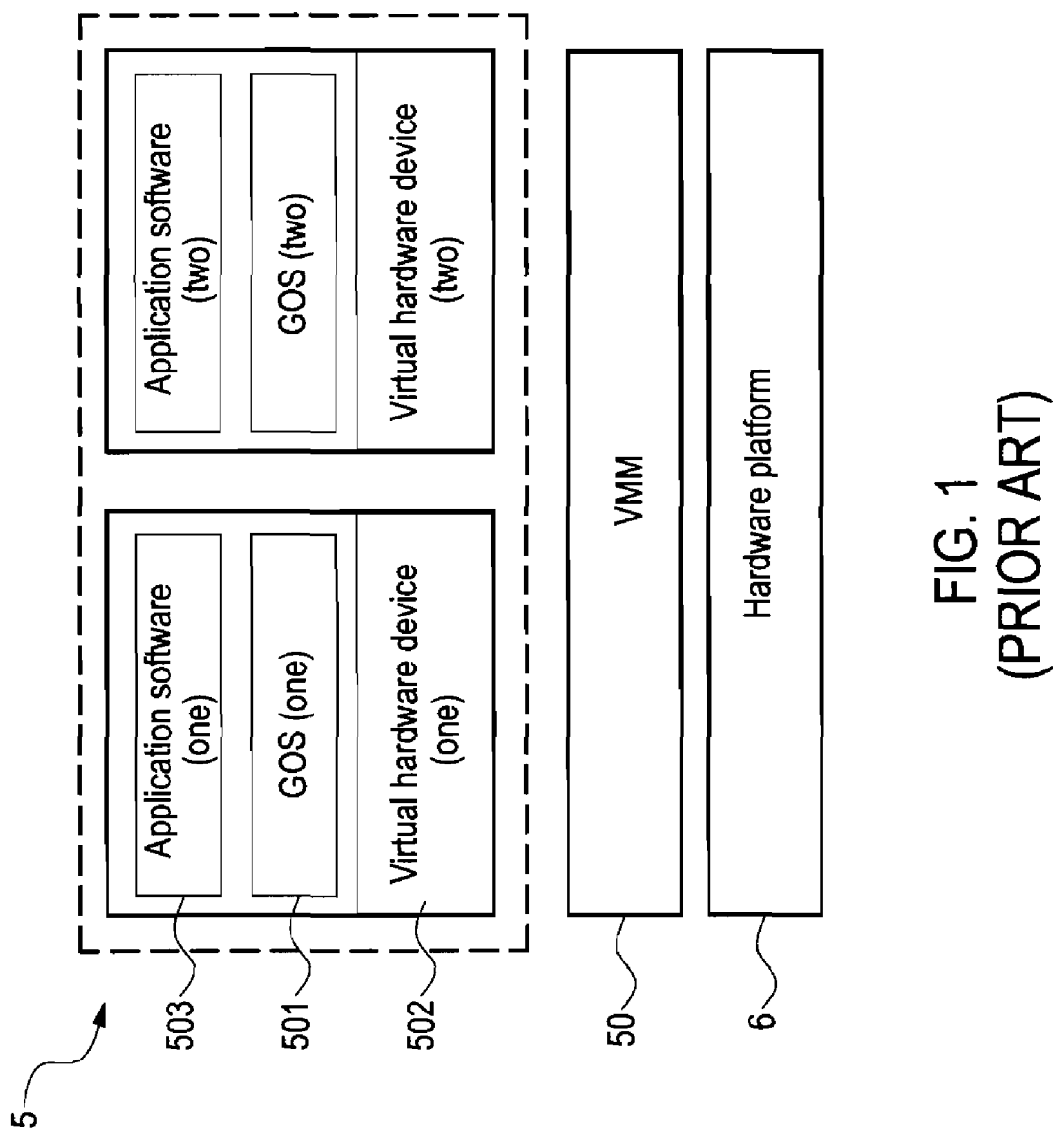
FIG. 1 is a schematic view of a conventional VM system.
Figure 2:
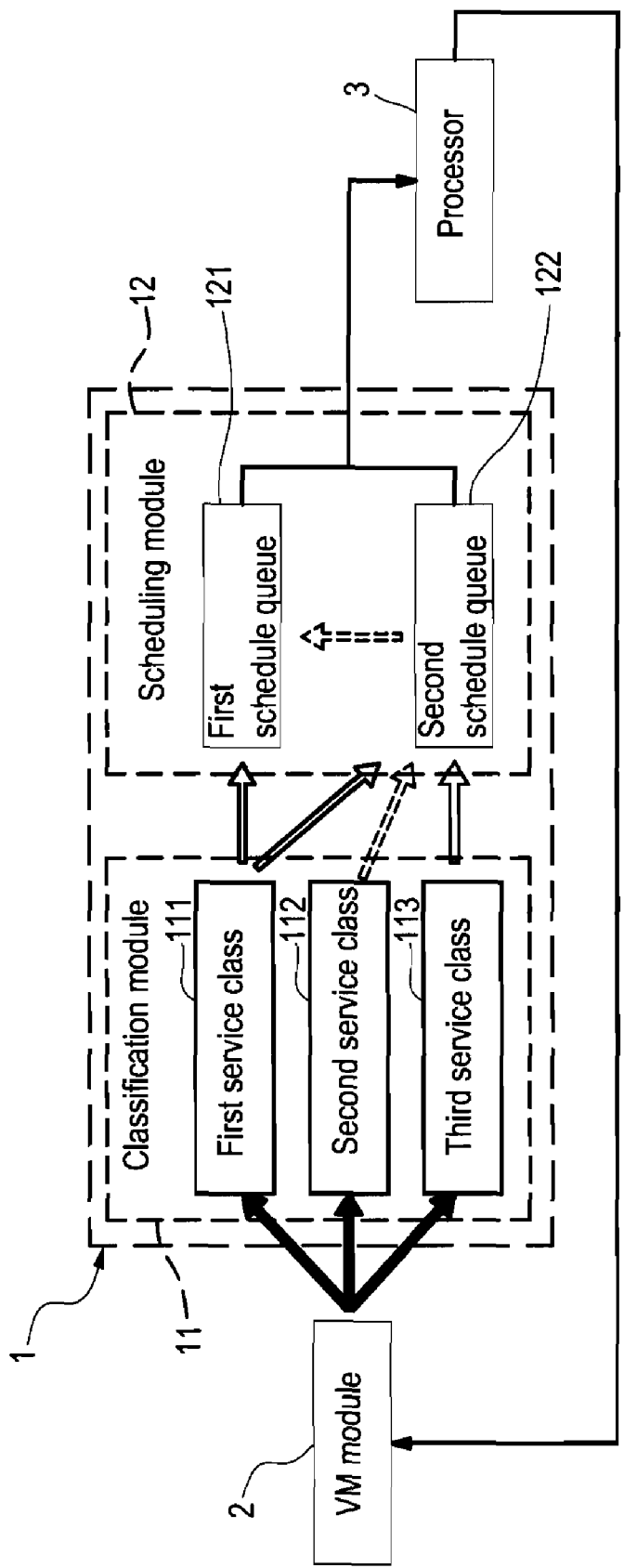
FIG. 2 is a schematic view of a scheduler of a VM module according to the present invention.

FIG. 2 is a schematic view of a scheduler of a VM module according to the present invention.

Referring to FIG. 2, the scheduler 1 of the VM module 2 of the present invention includes a classification module 11 and a scheduling module 12. The classification module 11 has a first service class 111, a second service class 112, and a third service class 113. The classification module 11 receives at least one VM module 2, and classifies the VM module 2 to the first service class 111, the second service class 112, or the third service class 113. The scheduling module 12 has a first schedule queue 121 and a second schedule queue 122. The scheduling module 12 sorts the VM module 2 of the first service class 111, the second service class 112, and the third service class 113 to the first schedule queue 121 or the second schedule queue 122, and outputs the VM module 2 of the three service layers to a processor 3 for execution.

The priority of the first schedule queue 121 is higher than that of the second schedule queue 122, the first schedule queue 121 arranges a sequence of executing the VM module 2 by the processor 3 through an FIFO mechanism, and the second schedule queue 122 arranges the sequence of executing the VM module 2 by the processor 3 through a credit mechanism.

Figure 3:
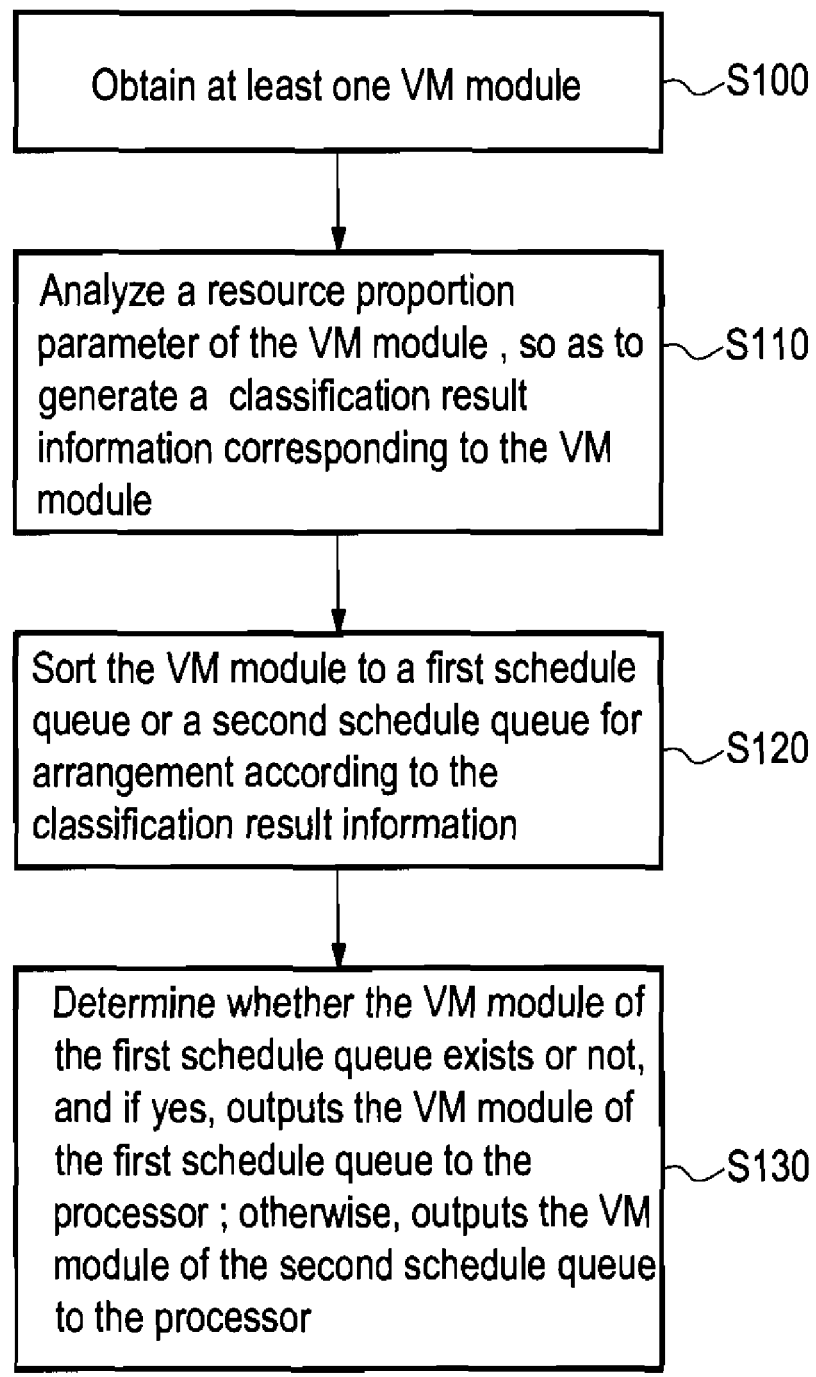
FIG. 3 is a schematic flow chart of the present invention.

FIG. 3 is a schematic flow chart of the present invention. Referring to FIG. 3, when one or more VM modules 2 require the resource of the processor 3, the VM module 2 is received by the scheduler 1 (Step S100). After obtaining the VM module 2, the scheduler 1 analyzes a resource proportion parameter of the VM module 2, so as to classify the VM module 2 and generate a classification result information (Step S110). The resource proportion parameter implements classification according to a proportion of an operating time of the input/output (I/O) device by the VM module 2 to a usage time of the processor 3 by the VM module 2. The I/O device is a peripheral equipment of a hardware platform, for example, a camera, a keyboard, a screen, or an optical disk drive, of the hardware platform on which the VM module 2 is installed.

Therefore, when the operating time of the I/O device by the VM module 2 is longer than the usage time of the processor 3, the VM module 2 is classified to the first service class 111. When the operating time of the I/O device by the VM module 2 is equal to the usage time of the processor 3, the VM module 2 is classified to the second service class 112. When the operating time of the I/O device by the VM module 2 is shorter than the usage time of the processor 3, the VM module 2 is classified to the third service class 113.

Through the classification of the three layers, individual service class attributes of each VM module 2 can be classified according to the operating time of the I/O device by each VM module 2 and the usage time of the processor 3.

Then, according to the classification result information, the scheduler 1 sorts the VM module 2 to a first schedule queue 121 or a second schedule queue 122 (Step S120). Here, the scheduler 1 first sorts the VM module 2 of the first service class 111 to the first schedule queue 121, the VM module 2 of the second service class 112 is sorted to the second schedule queue 122, and the VM module 2 of the third service class 113 is sorted to the second schedule queue 122. If the usage time of the processor 3 by the VM module 2 of the first service class 111 hinders the operation of the VM module 2 of the second service class 112 and the third service class 113, the VM module 2 of the first service class is sorted to the second schedule queue 122.

Next, the scheduler 1 determines whether the VM module 2 of the first schedule queue 121 exists or not, and if yes, outputs the VM module 2 of the first schedule queue 121 to the processor 3; otherwise, outputs the VM module 2 of the second schedule queue 122 to the processor 3 for execution (Step S130). In the above step, the first schedule queue 121 arranges a sequence of executing the VM module 2 by the processor 3 through an FIFO mechanism, such that in the first schedule queue 121, the scheduler 1 arranges the VM module 2 being the first sorted to the first schedule queue 121 at a preferential order to be executed by the processor 3. The second schedule queue 122 arranges the sequence of executing the VM module 2 by the processor 3 through a credit mechanism, such that after the VM module 2 of the first schedule queue 121 is executed by the processor 3, the scheduler 1 outputs the VM module 2 of the second schedule queue 122 to the processor 3 for execution.

After the VM module 2 of the second service class 112 is sorted to the second schedule queue 122, the operating time of the I/O device by the VM module 2 of the second schedule queue 122 is equal to the usage time of the processor 3. Therefore, in order to ensure a uniform allocation of the resource of the processor 3, the VM module 2 is first sorted to the second schedule queue 122. However, to prevent the VM module 2 from waiting too long in the second schedule queue 122 to obtain the resource of the processor 3, a credit is assigned to the VM module 2 of the second schedule queue 122 according to the credit mechanism and an upper time bound may be set on the VM module 2 of the second schedule queue 122. Then, according to the upper time bound, when the VM module 2 of the first schedule queue 121 is output to the process 3, the credit of the VM module 2 of the second schedule queue 121 is also updated. When the VM module 2 of the second schedule queue 122 reaches the upper time bound, the VM module 2 of the second service class is transferred from the second schedule queue 122 to the first schedule queue 121 so as to sequentially output to the processor 3 for execution, such that the time resource of the processor 3 can be effectively managed.

When the sequence of the VM module 2 of the first schedule queue 121 and the second schedule queue 122 is arranged, the priority of the first schedule queue 121 is higher than that of the second schedule queue 122. Therefore, the processor 3 first executes each VM module 2 of the first queue, and determines whether the VM module 2 still exists in the first schedule queue or not. If not, the processor 3 executes each VM module 2 of the second schedule queue, such that the VM module 2 obtains the resource of the processor 3 in sequence.

Seen from the above, the scheduler of the VM module, the scheduling method, and the device containing computer software of the present invention have the following efficacies.

1. Through the disposition of the first schedule queue and the second schedule queue of the scheduling region, the processor may execute the VM module having the I/O device and the VM module using the processor resource in sequence, such that the processor resource is uniformly allocated to each VM module, thereby improving the whole efficiency of the VM module.

2. The VM module having the limit of the operating time of the I/O device is sorted by the scheduler to the first schedule queue, for being preferentially executed by the processor, so as to solve the problem of obtaining the processor resource after rather a long delay of the operating time of the I/O device by the VM module.

3. In order to prevent the VM module from waiting too long in the second schedule queue to obtain the processor resource, the scheduler of the present invention first sets a upper time bound. In the present invention, an upper time bound may be set on the second schedule queue. When the VM module of the second schedule queue reaches the upper time bound, the VM module of the second service class is transferred from the second schedule queue to the first schedule queue so as to prevent the problem of the I/O device of the VM module from waiting too long to obtain the resource of the processor.

4. The VM modules with different service attributes are classified, and the sequence of the VM module is arranged for being executed by the processor through the FIFO mechanism and the credit mechanism of the first schedule queue and the second schedule queue, so as to realize the execution of various service types of VM modules at the same time on a single hardware platform.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scheduling method of a scheduler of a virtual machine (VM) module, comprising:
   obtaining at least one VM module;
   analyzing a resource proportion parameter of the VM module, so as to generate a classification result information corresponding to the VM module;
   sorting the VM module to a first schedule queue or a second schedule queue for arrangement according to the classification result information; and
   determining whether the VM module of the first schedule queue exists or not, and if yes, outputting the VM module of the first schedule queue to a processor; otherwise, outputting the VM module of the second schedule queue to the processor;
   wherein the second schedule queue arranges a sequence of the VM module through a credit mechanism, a credit is assigned to the VM module of the second schedule queue by the credit mechanism, and according to an upper time bound, when the VM module of the first schedule queue is output to the process, the credit of the VM module of the second schedule queue is updated and when the VM module of the second schedule queue reaches the upper time bound, the VM module of the second schedule queue is transferred to the first schedule queue so as to sequentially output to the processor.

2. The scheduling method of a scheduler of a VM module according to claim 1, wherein the first schedule queue adopts a first-in first-out (FIFO) mechanism to arrange the VM module.

3. The scheduling method of a scheduler of a VM module according to claim 1, wherein the resource proportion parameter implements classification according to a proportion of an operating time of an input/output (I/O) device by the VM module to a usage time of the processor by the VM module, and the VM module is sorted to the first schedule queue or the second schedule queue for arrangement according to the classification result information.

4. The scheduling method of a scheduler of a VM module according to claim 3, wherein according to the operating time and the usage time, the VM module is classified to a first service layer, a second service layer, or a third service layer, when the operating time is longer than the usage time, the VM module is classified to the first service layer; when the operating time is equal to the usage time, the VM module is classified to the second service layer; when the operating time is shorter than the usage time, the VM module is classified to the third service layer, and according to the three layers, the VM module is sorted to the first schedule queue or the second schedule queue for arrangement.

5. The scheduling method of a scheduler of a VM module according to claim 4, wherein according to the operating time and the usage time, the VM module of the first service class is sorted to the first schedule queue, the VM module of the second service class is sorted to the second schedule queue, and the VM module of the third service class is sorted to the second schedule queue.

6. A scheduler of a virtual machine (VM) module, comprising:
a classification module, for obtaining at least one VM module, and analyzing a resource proportion parameter of the VM module, so as to generate a classification result information corresponding to the VM module; and
a hardware scheduling module, having a first schedule queue and a second schedule queue, for sorting the VM module to the first schedule queue or the second schedule queue for arrangement according to the classification result information, then determining whether the VM module of the first schedule queue exists or not, and if yes, outputting the VM module of the first schedule queue to a processor; otherwise, outputting the VM module of the second schedule queue to the processor;
wherein the second schedule queue arranges a sequence of the VM module through a credit mechanism, a credit is assigned to the VM module of the second schedule queue by the credit mechanism, and according to an upper time bound, when the VM module of the first schedule queue is output to the process, the credit of the VM module of the second schedule queue is updated and when the VM module of the second schedule queue reaches the upper time bound, the VM module of the second schedule queue is transferred to the first schedule queue so as to sequentially output to the processor.

7. The scheduler of a VM module according to claim 6, wherein the first schedule queue adopts a first-in first-out (FIFO) mechanism to arrange the VM module.

8. The scheduler of a VM module according to claim 6, wherein the resource proportion parameter implements classification according to a proportion of an operating time of an input/output (I/O) device by the VM module to a usage time of the processor by the VM module, and the VM module is sorted to the first schedule queue or the second schedule queue for arrangement according to the classification result information.

9. The scheduler of a VM module according to claim 8, wherein according to the operating time and the usage time, the VM module is classified to a first service layer, a second service layer, or a third service layer, when the operating time is longer than the usage time, the VM module is classified to the first service layer; when the operating time is equal to the usage time, the VM module is classified to the second service layer; when the operating time is shorter than the usage time, the VM module is classified to the third service layer, and according to the three layers, the VM module is sorted to the first schedule queue or the second schedule queue for arrangement.

10. The scheduler of a VM module according to claim 9, wherein according to the operating time and the usage time, the VM module of the first service class is sorted to the first schedule queue, the VM module of the second service class is sorted to the second schedule queue, and the VM module of the third service class is sorted to the second schedule queue.

11. A device containing computer software loaded into an electronic device for executing a scheduling method of a scheduler of a virtual machine (VM) module, the schedule method comprising:
obtaining at least one VM module;
analyzing a resource proportion parameter of the VM module, so as to generate a classification result information corresponding to the VM module;
sorting the VM module to a first schedule queue or a second schedule queue for arrangement according to the classification result information; and
determining whether the VM module of the first schedule queue exists or not, and if yes, outputting the VM module of the first schedule queue to a processor; otherwise, outputting the VM module of the second schedule queue to the processor;
wherein the second schedule queue arranges a sequence of the VM module through a credit mechanism, a credit is assigned to the VM module of the second schedule queue by the credit mechanism, and according to an upper time bound, when the VM module of the first schedule queue is output to the process, the credit of the VM module of the second schedule queue is updated and when the VM module of the second schedule queue reaches the upper time bound, the VM module of the second schedule queue is transferred to the first schedule queue so as to sequentially output to the processor.

12. The device containing computer software according to claim 11, wherein the first schedule queue adopts a first-in first-out (FIFO) mechanism to arrange the VM module.

13. The device containing computer software according to claim 11, wherein the resource proportion parameter implements classification according to a proportion of an operating time of an input/output (I/O) device by the VM module to a usage time of the processor by the VM module, and the VM module is sorted to the first schedule queue or the second schedule queue for arrangement according to the classification result information.

14. The device containing computer software according to claim 13, wherein according to the operating time and the usage time, the VM module is classified to a first service layer, a second service layer, or a third service layer, when the operating time is longer than the usage time, the VM module is classified to the first service layer; when the operating time is equal to the usage time, the VM module is classified to the second service layer; when the operating time is shorter than the usage time, the VM module is classified to the third service layer, and according to the three layers, the VM module is sorted to the first schedule queue or the second schedule queue for arrangement.

15. The device containing computer software according to claim 14, wherein according to the operating time and the usage time, the VM module of the first service class is sorted to the first schedule queue, the VM module of the second service class is sorted to the second schedule queue, and the VM module of the third service class is sorted to the second schedule queue.

* * * * *